(12) United States Patent
Goldenberg et al.

(10) Patent No.: US 10,038,738 B2
(45) Date of Patent: Jul. 31, 2018

(54) COMPUTING SYSTEM AND METHOD FOR IDENTIFYING FILES TRANSMITTED TO AN EXTERNAL NETWORK

(71) Applicant: VOLKSWAGEN AG, Wolfsburg (DE)

(72) Inventors: Niv Goldenberg, Herzlia (IL); Evyatar Bluzer, Herzlia (IL)

(73) Assignee: VOLKSWAGEN AG, Wolfsburg (DE)

( * ) Notice: Subject to any disclaimer, the term of this patent is extended or adjusted under 35 U.S.C. 154(b) by 220 days.

(21) Appl. No.: 14/707,751

(22) Filed: May 8, 2015

(65) Prior Publication Data
US 2016/0006792 A1    Jan. 7, 2016

(30) Foreign Application Priority Data
Jul. 4, 2014 (EP) .................................... 14175818

(51) Int. Cl.
*G06F 15/16* (2006.01)
*H04L 29/08* (2006.01)
(Continued)

(52) U.S. Cl.
CPC .............. *H04L 67/06* (2013.01); *H04L 43/12* (2013.01); *H04L 51/18* (2013.01); *H04L 51/34* (2013.01); *H04L 63/1408* (2013.01); *H04L 51/08* (2013.01)

(58) Field of Classification Search
CPC ..... H04L 51/18; H04L 63/1408; H04L 51/08; H04L 51/34; H04L 67/06; H04L 43/12
(Continued)

(56) References Cited

U.S. PATENT DOCUMENTS

| 7,076,533 B1 | 7/2006 | Knox et al. |
| 2007/0094394 A1* | 4/2007 | Singh .................. H04L 63/0227 709/226 |

(Continued)

FOREIGN PATENT DOCUMENTS

WO    2009/032379    3/2009

OTHER PUBLICATIONS

C. Sanders, et al., "Using Canary Honeypots for Detection", Applied Network Security Monitoring: Collection, Detection, and Analysis, Ch. 12, Syngress, 2014.

(Continued)

*Primary Examiner* — Phuoc Nguyen
(74) *Attorney, Agent, or Firm* — Hunton Andrews Kurth LLP (57) ABSTRACT

A computing device includes a computing system and a method for identifying files transmitted from an internal computing device within an internal network to an external computing device within an external network. The computing system comprises one or more internal computing devices which are connectable by an internal network. At least one of the internal computing devices is configured to be operable as a workstation or as a file server, wherein the workstation or the file server is capable of generating, storing and/or transmitting a data file. Further, at least one of the internal computing devices is configured to be operable as an insertion device. The insertion device is capable of inserting a data file element into the data file to generate a tagged data file. Further, at least one of the internal computing devices is configured to be operable as a gateway. The gateway is capable of connecting the internal network to an external network. Further, at least one computing device is configured to be operable as a monitoring server. The monitoring server is capable of receiving information trans- (Continued)

mitted by an external computing device connected to the external network upon opening, reading and/or processing the tagged data file.

18 Claims, 2 Drawing Sheets

(51) Int. Cl.
*H04L 12/26* (2006.01)
*H04L 29/06* (2006.01)
*H04L 12/58* (2006.01)

(58) Field of Classification Search
USPC .......................................... 709/203, 217, 224
See application file for complete search history.

(56) References Cited

U.S. PATENT DOCUMENTS

| | | | |
|---|---|---|---|
| 2008/0059474 A1* | 3/2008 | Lim | ..................... G06F 17/3089 |
| 2009/0083372 A1* | 3/2009 | Teppler | ................. H04L 9/3226 |
| | | | 709/203 |
| 2010/0010968 A1* | 1/2010 | Redlich | ............. G06F 17/30672 |
| | | | 707/E17.014 |
| 2014/0136680 A1* | 5/2014 | Joshi | ........................ H04L 41/12 |
| | | | 709/224 |

OTHER PUBLICATIONS

European Search Report, dated Oct. 1, 2014, issued in corresponding European Patent Application No. 14175818.5.

* cited by examiner

COMPUTING SYSTEM AND METHOD FOR IDENTIFYING FILES TRANSMITTED TO AN EXTERNAL NETWORK

CROSS REFERENCE TO RELATED APPLICATIONS

The present invention claims priority to application Ser. No. 14/175,818.5, filed in the European Patent Office on Jul. 4, 2014, which is expressly incorporated herein in its entirety by reference thereto.

FIELD OF THE INVENTION

The present invention relates to a computing system, and more particularly to a computing system and a method for identifying files transmitted from an internal computing device within an internal network to an external computing device within an external network.

BACKGROUND INFORMATION

In many computer networks, in particular enterprise networks, confidential information is generated, stored and processed. This confidential information needs to be protected from unauthorized access. Most such networks are connected to external networks to facilitate the exchange of information. Oftentimes, this external connection is provided by access to the internet. The connection to external networks provides a gateway through which unauthorized parties can access the confidential information within the internal network. Certain approaches to effectively preventing such unauthorized access to the internal network are conventional. A threat to information security that is harder to control is posed by the technical possibility of authorized users of the internal network sending confidential information over or to the external network. Once such information has left the internal network, it can no longer be controlled. In the following, the term "security leak" shall be used to refer to confidential information being transmitted to or over an external network without authorization.

A method for detecting unauthorized access to resources (such as confidential information, devices or services) is known as "honeypots" or "canary honeypots." In this method, the resources are prepared such that any unauthorized access can be detected. The such prepared resource is intentionally used to attract unauthorized access (hence the name "honeypot"). Further information on the described method is disclosed in "Chapter 12: Using Canary Honeypots for Detection" of the book "Applied Network Security Monitoring: Collection, Detection, and Analysis" by Chris Sanders and Jason Smith, Syngress, 2014.

WO 2009/032379 A1 teaches an example of a honeypot defense for a communications network. In the disclosed method, a decoy information with an embedded beacon is placed into a computing environment. The embedded beacon provides an indication that the decoy information has been accessed by an attacker.

A method for detecting access to computer files is offered publicly under the name "HoneyDocs" at the internet address http://www.honeydocs.com. Users can upload a file in certain file formats to said website, where an object is then inserted into the file and the modified file is sent back to the user. When the modified file is opened, the software used to open the file is triggered by the inserted object to download an image file from an internet server controlled by Honey- Docs. The access to the file can thus be detected and the user can be informed that the file was accessed.

It is conventional to set traps (e.g. "honeypots") to attract and detect unauthorized access to certain network resources, in particular computer files. However, any such file must be manually selected and prepared in order to detect any unauthorized access to it.

SUMMARY

Example embodiments of the present invention provide a computing system and a method for identifying files transmitted from an internal network to an external network that can be automatized and applied to a large number of files.

A computing system according to an example embodiment of the present invention comprises one or more internal computing devices which are connectable by an internal network. Such computing devices may be general-purpose computers configured to be operable for one or several different purposes or may be specific computers configured to be operable only for a particular purpose.

In the computing system according to an example embodiment of the present invention, at least one of the internal computing devices is configured to be operable as a workstation or as a file server, wherein the workstation or the file server is capable of generating, storing and/or transmitting a data file.

Further, in an example embodiment of the present invention, at least one of the internal computing devices is configured to be operable as an insertion device. The insertion device is capable of inserting a data file element into the data file to generate a tagged data file. The insertion device may be any computing device, e.g. a workstation or a file server, or it may be a dedicated computing device (e.g., a server) serving only the purpose of inserting a data file element into the data file to generate a tagged data file. In order to create the tagged data file, the insertion device must have permission to read and write the data file. The data files to be tagged may be stored directly on the insertion device or the insertion device may have access to the data files over the internal network.

It is noted that the term "internal network" as presently used is not restricted to physically connected contiguous networks. The person skilled in the art will be aware of various known methods for forming internal networks including computing devices that are physically connected only by an external network. One example for such a method is a virtual private network (VPN), in which secure communication channels can be established between computing devices over an external network. For example, in the present invention, the insertion device may be connected to the internal network by a VPN connection. The VPN connection could for example be set up between the insertion device and a gateway, as described below, wherein the physical communication channel between the insertion device and the gateway is provided by the external network.

Further, in an example embodiment of the present invention, at least one of the internal computing devices is configured to be operable as a gateway. The gateway is capable of connecting the internal network to an external network. Hence, it connects the internal network to any external network or computer. A common configuration of an internal network is to have exactly one gateway connecting the internal network to the internet. However, an internal network can have more than one gateway, and it can be connected to more than one external network and to external networks other than the internet. Also, large enterprise networks often consist of multiple internal networks that are connected internally by internal gateways. In the context of the present invention, an internal network may include such a structure of multiple interconnected internal networks. A gateway may refer to the device that connects the internal network to one or more external networks.

In an example embodiment of the invention, the same computing device serves as insertion device and as gateway. As each data file that is transmitted over or to the external network must pass the gateway, this configuration facilitates the tagging of all data files or a selected subset of data files.

Further, in an example embodiment of the present invention, at least one computing device is configured to be operable as a monitoring server. The monitoring server is either an internal computing device or an external computing device. The monitoring server is capable of receiving information transmitted by an external computing device connected to the external network upon opening, reading and/or processing the tagged data file. When a tagged data file is opened, read and/or processed by an external computing device, the external computing device is caused to transmit information to the monitoring server. This information can be sent to the monitoring server either directly or indirectly via other devices within the external and/or internal network. The monitoring server may be a dedicated device serving only the purpose of receiving said information. In a different configuration, the monitoring server is provided by a computing device serving a different additional purpose. In an example embodiment of the invention, the same computing device serves as monitoring server and as gateway. In an example embodiment, a single computing device serves as insertion device, as monitoring server and as gateway. This concentration of functions onto a single device facilitates the practical realization of this example embodiment of the present invention, because only one single device must be configured in order to implement the invention. In a different configuration, the monitoring server is a server in the external network that does not require any connection to the internal network. For example, the monitoring server may be an internet server.

In an example embodiment of the invention, the insertion or injection device is configured to generate a tagged data file from at least a subset of data files transmitted from the internal network to the external network through the gateway. The majority of data files are transmitted from an internal (e.g., enterprise) network to an external network by network connections, most notably via e-mail. Alternative transmission paths, such as transmission on a physical memory media such as USB sticks, are possible, but occur less frequently in practice. Moreover, network policies may be enforced that prevent saving files to physical memory media. An example for a commonly used policy is known as Microsoft Active Directory Group Policy. The exchange of information over network connections, on the other hand, is often a working requirement and can hardly be restricted. The present embodiment utilizes the fact that all data files that are transmitted to an external destination (i.e., to a destination outside of the internal network) are funneled through the gateway.

In an example embodiment of the present invention, not all data files that pass the gateway are tagged, but only a subset of these data files. There are circumstances when the transmission of a data file to an external network does not pose a security threat, including, but not limited to the following:

The data file does not contain confidential information.
The data file is transmitted to a trusted party on an encrypted channel.
The data file has been released for transmission and has been marked accordingly.
The data file is sent by a user who does not have access to confidential information within the internal network.

An advantage of not tagging such uncritical files is that the monitoring server will receive fewer responses. At the same time, the responses that the monitoring server does receive are more likely to indicate an actual security leak. The subset of data files that are tagged may be selected according to at least one of the following criteria, which may be contained in or associated with each data file:

file format,
confidentiality level,
file owner (i.e., network user who owns the file),
addressee or receiver of the file.

Alternatively or additionally, all data files that are transmitted over encrypted connections may be exempt from tagging. The person skilled in the art will be able to extend and adapt the mentioned criteria according to his or her security needs without leaving the scope of the claimed invention.

In another example embodiment of the invention, the insertion device is configured to generate tagged data files from at least a subset of data files saved and/or located on at least one of a pre-defined group of internal computing devices. As described above, it is advantageous to limit the number of files that become tagged in order to minimize the number of responses the monitoring server will receive. It is, of course, crucial to pick the right files for tagging. Security-relevant files may not occur randomly on computing devices within the internal network, but may be stored and/or located on certain selected internal computing devices. For example, such files are likely to be stored and/or located on workstations that belong to users who work with confidential information. In this case, the pre-defined group of internal computing devices may comprise all workstations belonging to users with access to information of at least a certain confidentiality level. In another example, security-relevant files may be stored on particular file servers. These servers may then form the pre-defined group of internal computing devices.

In summary, an example embodiment of the invention comprises two different insertion or injection methods. In one example embodiment, data files transmitted through the gateway are tagged. In a different example embodiment, data files that are saved and/or located on one or more internal computing devices are tagged. The invention also encompasses any combination of these two example embodiments. When both embodiments are used in combination, a data file that is transmitted through the gateway may have already been tagged. In this case, the insertion device may be configured to detect that the tagged data file already contains a data file element and the tagged data file is transmitted over the gateway without additional tagging.

In a further example embodiment of the invention, the insertion device is configured to generate tagged data files from at least a subset of data files owned, controlled and/or accessible by a pre-defined group of users of the internal network. As described above, the group of users with access to confidential information may be a subset of all users. In many networks, e.g. networks running on Unix-based operating systems or networking software, every file is owned by a particular user, i.e., every file is marked with an attribute that refers to the user that created and/or saved and/or modified the file. Hence, the number of files to be tagged may be limited to those files that are owned by those users with access to confidential information. Equally, all files may be tagged that are accessible (rather that actually owned) by a pre-defined user group. The advantage of this embodiment is that it is not required to determine the actual location of the file. However, it is also possible to make the file selection for tagging based on both locations of the file and ownership of and/or access to the file.

The format and content of the inventive data file element can be chosen freely and must only satisfy the condition that the data file element causes an external computing device to transmit information to the monitoring server upon opening, reading and/or processing the tagged data file. In an example embodiment of the invention, the data file element comprises at least one element of the group of

- a computer program executable by the external computing device upon opening, reading and/or processing the tagged data file;
- an electronically signed element containing a Certificate Authority's network address to be contacted by the external computing device upon opening, reading and/or processing the tagged data file; and
- a reference to a network address of a content element to be downloaded by the external computing device upon opening, reading and/or processing the tagged data file.

Computer programs executable by the external computing device upon opening, reading and/or processing the tagged data file may comprise binary, i.e., compiled, machine-readable, objects that are automatically executed upon opening, reading and/or processing the tagged data. An example for such computer programs could be Java applets. Certain file formats provide for the insertion of other binary software objects. For example, Portable Document Format (PDF) files can host binary objects such as the so-called "Action" object. An action object triggers a certain action when a certain condition is met. In accordance with an example embodiment of the invention, the data file element may be an action object that causes the external computing device to contact a certain network address (namely the monitoring server's address) upon opening of the PDF data file. A suitable type of Action object that achieves this task is "ImportData" as defined in the PDF file format.

Computer programs executable by the external computing device upon opening, reading and/or processing the tagged data file may also comprise text-based software scripts that are automatically executed upon opening, reading and/or processing the tagged data. Any scripting language that is understood by the software program with which the tagged data file is opened, read and/or processed is suitable for the purpose of the invention. An example for a suitable scripting language is JavaScript.

The data file element may be an electronically signed element containing a Certificate Authority's network address to be contacted by the external computing device upon opening, reading and/or processing the tagged data file. Certain file formats provide for the file to be electronically signed. In an asymmetric (often called "public-private key") encryption scheme, a first user can sign a file using his private key. A second user can verify the signature using the first user's public key and thus verify that the file was really signed by the first user. In order to ensure the users' keys' integrity, keys may be revoked before their expiry date and a database may contain an up-to-date list of revoked keys. This database may be accessed at the Certificate Authority's (CA) network address. An example embodiment of the invention may be implemented by a data file element that is either an electronically signed element or that is an electronic signature itself. Upon opening, reading and/or processing the tagged data file, the external computing device will contact the CA to inquire whether the user's key used for the electronic signature has been revoked. In this example embodiment of the invention, the monitoring server is used as a CA (or the monitoring server is connected to the CA). In order not to provoke any security alerts by the external computing device, it is preferable to respond positively to the described request, i.e., to confirm that the respective key has not been revoked.

The data file element may be a reference to a network address of a content element to be downloaded by the external computing device upon opening, reading and/or processing the tagged data file. Many file formats allow references to elements to be embedded in a file. Then, the element itself is not embedded in the file but is obtained from the address pointed to by the reference when needed. The types of elements that can be embedded by reference include images, other files and templates. In Microsoft Office software formats, for example, other files can be included by reference using "Object linking and embedding" (OLE). Microsoft office also offers the option to incorporate external templates by reference.

In an example embodiment of the invention, the data file elements do not become visible upon opening the tagged data file. This can, e.g., be achieved by small or zero-sized images, i.e., by images having one or zero pixel height and width. This can, e.g., be achieved by reference to a network address of a content element that does not exist. Then, upon opening, reading and/or processing the tagged data file, the external computing device will contact the given network address (namely the monitoring server's address) and receive the information that the requested element does not exist. In an example embodiment, the data file element may be chosen such that the software that is (presumably) used on the external computing device to open the tagged data file does not issue any user notifications, alerts or warnings when an embedded object does not exist and cannot be obtained from its network address.

Certain file formats provide for the insertion of certain elements. The data file element to be inserted into a file of a particular file type may be chosen from the group of elements that this file type provides for. This has the advantage that when the tagged data file is opened, read and/or processed by the external computing device, the data file element will be an expected part of the tagged data file and the external computing device will react to it in a predictable way. In contrast, using data file elements that are not provided for in the file format's definition may cause the external computing device to react unpredictably. In particular, the external computing device may react by prompting a security warning to its user.

In a further example embodiment of the invention, the insertion or injection device is configured to process information associated with the data file to generate an adaptive data file element for insertion into the data file to generate the tagged data file. In other words, varying data file elements are used to tag different data files. Hence, it becomes possible to embed information about a particular data file in the corresponding tagged data file.

Without this adaptive tagging, the information transmitted by the external computing device upon opening, reading and/or processing the tagged data file, which is received by the monitoring device, is limited to the information that a file from the internal network has been opened or read. It may also include information about the environment (computer and network) in which the file was opened, read and/or processed. In a typical internet communication, such information may include the IP address and/or the user agent. However, only very limited information about the file itself can be conveyed.

In contrast, with adaptive tagging, the embedded data file element can include a variety of information associated with the data file. This information may then be transmitted to the monitoring server upon opening, reading and/or processing the tagged data file.

Preferably, the information associated with the data file comprises at least one element of the group of
 a file name of the data file;
 a name of a user owning, controlling and/or having access to the data file;
 a name and/or e-mail address and/or identifier of a sender of an e-mail to which the data file is attached;
 a file type of the data file;
 a content descriptor of the data file;
 a distinctive document identifier; and
 a date and/or time associated with the data file.

Being an internal computing device, the insertion device has access to the above-mentioned information elements and can easily be configured to include in the adaptive data file element those elements of information that are considered relevant for a later analysis of a potential network security leak.

In a further example embodiment of the invention, the monitoring server is configured to process the information transmitted by the external computing device. Once the monitoring server has received information sent from an external computing device that hints to a potential security leak, it is desirable to extract as much knowledge about this leak from the received information as possible. This knowledge may include at least one element from the following list:
 a network address of the external computing device;
 a user name of a user of the external computing device;
 a geographic location of the external computing device;
 information relating to a network provider of the external computing device;
 information relating to an operating system of the external computing device;
 information relating to software used and/or installed on the external computing device.

A network address may be an IP address. A user name may include various information about the user and/or host of the external computing device or of its operating system and/or other software. A geographical location of the external computing device may be transmitted explicitly to the monitoring server. The monitoring server may also implicitly extract the geographical location from other information. The geographical location may be obtained from so-called geolocation databases, from which the geographical location can be retrieved for a given network address. Alternatively or additionally, the network round-trip time (RTT) can be used to estimate the distance from the external computing device.

When an adaptive data file element is used to tag the data file, the monitoring server can be further configured to extract from the information transmitted by the external computing device at least one element of the above-described group of information associated with the data file used to generate the adaptive data file element.

Tagged data file may be opened, read and/or processed within the internal network. In this case, too, information will be transmitted to the monitoring server. In a further example embodiment of the invention, the monitoring server is capable of receiving such information transmitted by an internal computing device upon opening, reading and/or processing the tagged data file. The monitoring server is further configured to identify a computing device as being either external or internal based on the information transmitted by the computing device. If the information is identified as coming from an internal computing device, it may be instantly discarded. This embodiment allows a large number of files within the internal network to be tagged without disrupting the receptiveness of the monitoring server for information sent from external computing devices.

In an example embodiment of the invention, the monitoring server is configured to generate a warning signal upon identification of an external computing device. The warning signal may comprise an entry into a list or database that contains all information sent from external computing devices upon opening, reading and/or processing a tagged data file (and/or all knowledge extracted from such information). It may further comprise an optical and/or acoustic warning signal to a network administrator.

In a further preferred embodiment of the invention, the monitoring server can store and process a list (or whitelist) of external computing devices that are entitled to access tagged data files. When the information received by the monitoring server was sent from an external computing device on the whitelist, it may be instantly discarded. In this embodiment, certain external computing devices may be excluded from the security leak monitoring. For example, users of the internal network who work on data files using external computing devices (such as their home computer) will no longer trigger false security leak alarms if their external device is put on the whitelist. The whitelist may be adapted, e.g., personalized, to each tagged file, such that for example a file created by user A would not generate an alert in the monitoring server if opened in the home computer of user A but would generate a warning signal if opened in the home computer of user B, and vice versa.

The present invention further comprises a method for identifying files transmitted from an internal computing device within an internal network to an external computing device within an external network, the method comprising the steps of
 generating a data file element;
 inserting the data file element into a data file to generate a tagged data file;
 transmitting the tagged data file from the internal computing device to the external computing device;
 receiving information transmitted by an external computing device upon opening, reading and/or processing the tagged data file.

Further features and aspects of example embodiments of the present invention are explained in greater detail below with reference to the appended Figures.

DETAILED DESCRIPTION

It is emphasized that the following description merely refers to an exemplary embodiment. It must not be understood as limiting the scope of the invention, which includes all embodiments, variations, modifications and feature combinations covered by the appended claims and by the foregoing description.

Figure 1:
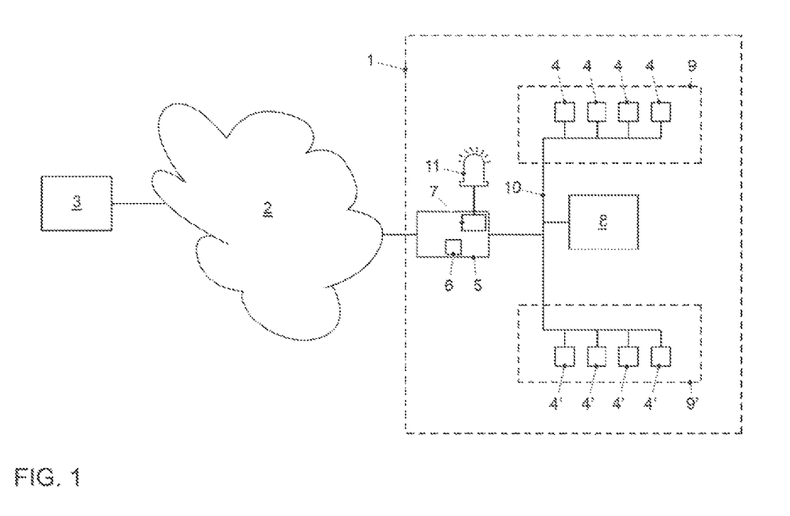
FIG. 1 shows a network including a computing system according to one example embodiment of the invention.

Reference is made to FIG. 1 which shows a network including a computing system according to one embodiment of the present invention.

The depicted computing system 1 includes several computing devices 4, 4', 5, 6, 7, 8. Some computing devices 4, 4' are configured to be operable as workstations.

One computing device is configured to be operable as a gateway 5. A computing device according to the invention may be configured to be operable in more than one function. In the depicted exemplary embodiment, the computing device that is configured to be operable as a gateway 5 is additionally configured to be operable as an insertion device 6 and as a monitoring server 7. It is understood that the gateway 5, insertion device 6 and monitoring server 7 may also be incorporated by separate computing devices. The monitoring server 7 is coupled to a warning signal device 11. All computing devices of the internal network are connected by a network connection 10. Not shown in FIG. 1 are devices (switches, hubs) well known in the prior art that enable the network connection 10. The computing system further includes a file server 8. Some workstations 4 are grouped in one sub network 9, other workstations 4' are grouped in a different sub network 9'.

FIG. 1 further shows an external network 2, to which the internal network is connected by the gateway 5. In particular, the external network 2 may be the internet. Further shown is an external computing device 3 that is connected or connectable to the external network 2.

Different users of the internal network may have different levels of access to confidential data. For example, the users of workstations 4 of sub network 9 may have access to confidential information, whereas users of workstations 4' of sub network 9' may have access only to publicly available, non-confidential information. Data files containing confidential information may be stored on the workstations 4 and/or may be stored on the file server 8. Data files containing confidential information may be stored in dedicated sections of the file server 8. The data files containing confidential information may contain meta-information that contains their confidentiality level, information about their owner and/or information about the users having access to the file. In one example embodiment of the invention, the insertion device 6 scans all possible locations at which confidential data files may be located and tags them.

In an alternative, example embodiment of the invention, only those files are tagged that are sent to an external computing device 3, for example by e-mail. In the shown exemplary embodiment, all e-mails go through the gateway 5. The gateway 5 scans every e-mail for data file attachments. If a data file is detected, it is stripped from the e-mail, tagged and re-attached to the e-mail. The e-mail is then dispatched to its recipient.

With reference to FIGS. 2A, 2B, 2C and 2D, an exemplary embodiment of the inventive method is explained.

Figure 2A:
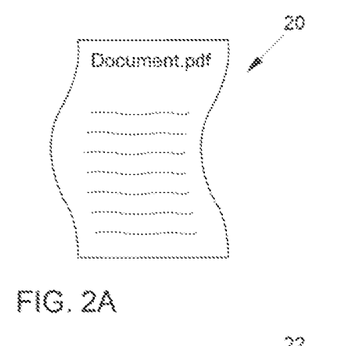
FIG. 2A shows an exemplary data file.
Figure 2B:
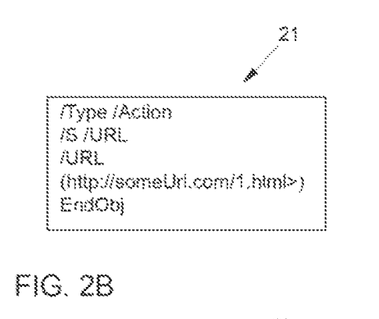
FIG. 2B shows an exemplary data file element.

As explained above, all outgoing e-mails are scanned for attached data files 20, an example of which is shown in FIG. 2A. This scan can be done by the gateway 5 or by the insertion device 6. As all e-mails are sent through the gateway and all incoming information is received through the gateway, it is a preferred embodiment to incorporate the gateway 5, the insertion device 6 and the monitoring server 7 into one single computing device. When the gateway 5 detects that an e-mail with an attached data file 20 is being sent, it initiates the inventive method. In the simplest embodiment, all outgoing files are tagged, irrespective of their owner, confidentiality level or other information. In a first step, the insertion device 6 generates a data file element 21, depicted in FIG. 2B. This data file element may be an adaptive data file element 21 containing information about the data file 20 such as its name 25, its document ID and/or its owner. The adaptive data file element may also contain information about the e-mail to which the data file 20 is attached. This information may include the name and address of the e-mail's sender, the name and address of the e-mail's recipient, and/or a date and time 26 at which the e-mail was sent. In the depicted example, the data file 20 is a file in PDF format. The data file element 21 is an Action object. Following the step of generating the data file element 21, the data file element 21 is inserted into the data file 20 to generate a tagged data file 22, shown in FIG. 2C. The tagged data file 22 is then re-attached to the e-mail and the e-mail is sent by the gateway 5 over the external network 2 to its recipient at an external computing device 3.

Figure 2C:
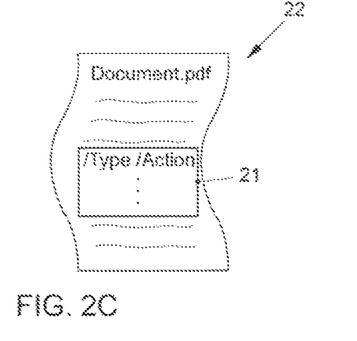
FIG. 2C shows an exemplary tagged data file.

The external user at external computing device 3 receives the e-mail with the attached data file 22. He opens the attached file 22 using the software program commonly used for this purpose. Upon opening the tagged data file 22, the software program automatically executes the attached Action object 21. The exemplary Action object 21 contains a "RemoteData" command which prompts the software program to download content from a specific network address (URL) given in the Action object. The network address is a network address of the monitoring server 7. It may also be a network address of the gateway 5, which would then receive the download request and convey it to the monitoring server 7. The network address may be a URL. The URL may point to a specific file, i.e., it may include a specific file name. In a preferred embodiment, the file name contains information associated with the data file. For example, if the data file's name is "Document.pdf", the URL placed in the Action object 21 may be http://someUrl-.com/Document.pdf-date-time-further_information". In this example, "someUrl.com" is the address of the monitoring server 7. If the request for "Document.pdf-date-time-further_information" reaches the monitoring server 7, it can extract the following information about the opened file:

file name is "Document.pdf";
date and time at which the data file was created or the date and time at which the data file was sent by e-mail;
further information ("further_information").

Figure 2D:
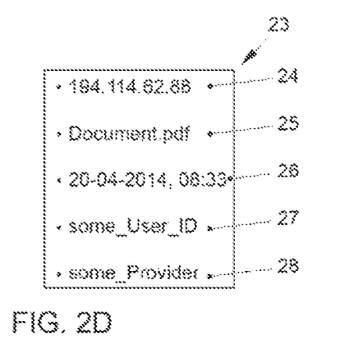
FIG. 2D shows an exemplary compound of information received by the monitoring device.

An example of the compound of information transmitted by the external computing device 3 to the monitoring server 7 upon opening the tagged data file 22 is depicted in FIG. 2D. In addition to information encoded in the URL specified in the Action object 21, the Action object can be configured to transmit further information. Further in addition, the compound 23 may include information that is transmitted with every IP packet. Such information includes the sender's IP address. In the depicted example, the compound of information 23 includes the IP address 24 of the external computing device 3;
the name 25 of the data file;
the date and time 26 at which the data file was created or the date and time at which the data file was sent by e-mail;
the user ID 27 of the external user; in addition, the user ID of the internal user who sent the data file may be received if such information was included in the data file element (21);

information 28 about the network provider of the external computing device 3.

Once the monitoring device 7 has received the information 23, it may evaluate the importance of the information 23. For example, it may check whether the IP address 24 is listed on a whitelist of trusted external computing devices. If this is the case, no further action is taken. If the monitoring device 7 determines that the information 23 is indeed relevant, or if the monitoring device 7 is not configured to undertake any determination or assessment of the relevance of the information 23, the monitoring device 7 generates a warning signal using warning signal device 11 to alert a network administrator or security officer. Additionally or alternatively, the monitoring server 7 may write an entry into a list or database that contains all information 23 sent from external computing devices and/or all knowledge extracted from such information.

LIST OF REFERENCE CHARACTERS

1 Computing system
2 External network
3 External computing device
4, 4' Workstations
5 Gateway
6 Insertion device
7 Monitoring server
8 File server
9, 9' Sub networks
10 Network connection
11 Warning signal device
20 Data file
21 Data file element
22 Tagged data file
23 Compound of information
24 IP address
25 Document identifier
26 Date and time
27 User ID
28 Network provider ID

What is claimed is:

1. A computing system for identifying files transmitted from an internal computing device within an internal network to an external computing device within an external network, comprising:
   at least one internal computing device connectable by the internal network;
   wherein at least one of the internal computing devices includes (i) a workstation, or (ii) a file server, and is configured to at least one of generate, store, and transmit a data file;
   wherein at least one of the internal computing devices includes a gateway configured to connect the internal network to the external network;
   wherein at least one of the internal computing devices includes an insertion device configured to determine whether to insert a data file element into the data file based on one or more criteria associated with the data file, to insert the data file element into the data file to generate a tagged data file based on the one or more criteria associated with the data file, and to transmit the tagged data file or the data file to the external computing device connected to the external network through the gateway based on the one or more criteria associated with the data file; and
   a monitoring server configured to receive information transmitted by the external computing device connected to the external network upon opening, reading, or processing the tagged data file;
   wherein the monitoring server is at least one of (i) an internal computing device and (ii) an external computing device.

2. The computing system according to claim 1, wherein the one or more criteria associated with the data file includes at least one of the following group:
   (i) a file format of the data file;
   (ii) a confidentiality level of the data file;
   (iii) a sender or receiver of the data file;
   (iv) a source or storage location of the data file;
   (v) an owner of the data file; and
   (vi) a person having access to the data file.

3. The computing system according to claim 1, wherein the insertion device is configured to generate tagged data files from at least a subset of data files saved or located on at least one of a pre-defined group of internal computing devices.

4. The computing system according to claim 1, wherein the insertion device is configured to generate tagged data files from at least a subset of data files owned, controlled, or accessible by a pre-defined group of users of the internal network.

5. The computing system according to claim 1, wherein the data file element includes at least one of (i) a computer program executable by the external computing device upon opening, reading, or processing the tagged data file; (ii) an electronically signed element containing a Certificate Authority's network address to be contacted by the external computing device upon opening, reading, or processing the tagged data file; and (iii) a reference to a network address of a content element to be downloaded by the external computing device upon opening, reading, or processing the tagged data file.

6. The computing system according to claim 1,
   wherein the insertion device is configured to process information associated with the data file to generate an adaptive data file element for insertion into the data file to generate the tagged data file;
   the information associated with the data file including at least one of (i) a file name of the data file; (ii) a name of a user owning, controlling, or having access to the data file; (iii) a name, e-mail address, or identifier of a sender of an e-mail to which the data file is attached; (iv) a file type of the data file; (v) a content descriptor of the data file; (vi) a distinctive document identifier; and (vii) a date or time associated with the data file.

7. The computing system according to claim 1, wherein the monitoring server is configured to process the information transmitted by the external computing device and to extract from the information transmitted by the external computing device at least one of (i) a network address of the external computing device; (ii) a user name of a user of the external computing device; (iii) a geographic location of the external computing device; (iv) information relating to a network provider of the external computing device; (v) information relating to an operating system of the external computing device; and (vi) information relating to software used or installed on the external computing device.

8. The computing system according to claim 6,
   wherein the monitoring server is configured to process the information transmitted by the external computing device and to extract from the information transmitted by the external computing device at least one of (i) a network address of the external computing device; (ii) a user name of a user of the external computing device;

(iii) a geographic location of the external computing device; (iv) information relating to a network provider of the external computing device; (v) information relating to an operating system of the external computing device; and (vi) information relating to software used or installed on the external computing device; and wherein the monitoring server is further configured to extract from the information transmitted by the external computing device at least one element of the group of information associated with the data file used to generate the adaptive data file element.

9. The computing system according to claim 8, wherein the monitoring server is configured to receive information transmitted by an internal computing device upon opening, reading, or processing the tagged data file, and to identify a computing device as being either external or internal based on the information transmitted by the computing device.

10. The computing system according to claim 9, wherein the monitoring server is configured to generate a warning signal upon identification of an external computing device.

11. A method for identifying files transmitted from an internal computing device within an internal network to an external computing device within an external network, the method comprising:

determining whether to insert a data file element into the data file based on one or more criteria associated with the data file;

generating the data file element;

inserting the data file element into a data file to generate a tagged data file;

transmitting the tagged data file from the internal computing device to the external computing device through a gateway; and receiving information transmitted by an external computing device upon opening, reading, or processing the tagged data file.

12. The method according to claim 11, wherein the one or more criteria associated with the data file includes at least one of the following group:

(i) a file format of the data file;
(ii) a confidentiality level of the data file;
(iii) a sender or receiver of the data file;
(iv) a source or storage location of the data file;
(v) an owner of the data file; and
(vi) a person having access to the data file.

13. The method according to claim 11, wherein the data file element includes at least one of (i) a computer program executable by the external computing device upon opening, reading, or processing the tagged data file; (ii) an electronically signed element containing a Certificate Authority's network address to be contacted by the external computing device upon opening, reading, or processing the tagged data file; and (iii) a reference to a network address of a content element to be downloaded by the external computing device upon opening, reading, or processing the tagged data file.

14. The method according to claim 11, further comprising:

processing information associated with the data file to generate an adaptive data file element for insertion into the data file to generate the tagged data file;

the information associated with the data file including at least one of (i) a file name of the data file; (ii) a name of a user owning, controlling, or having access to the data file; (iii) a name, e-mail address, or identifier of a sender of an e-mail to which the data file is attached; (iv) a file type of the data file; (v) a content descriptor of the data file; (vi) a distinctive document identifier; and (vii) a date or time associated with the data file.

15. The method according to claim 11, further comprising:

extracting from the information transmitted by the external computing device at least one of (i) a network address of the external computing device; (ii) a user name of a user of the external computing device; (iii) a geographic location of the external computing device; (iv) information relating to a network provider of the external computing device; (v) information relating to an operating system of the external computing device; and (vi) information relating to software used or installed on the external computing device.

16. The method according to claim 14, further comprising:

extracting from the information transmitted by the external computing device at least one element of the group of information associated with the data file used to generate the adaptive data file element.

17. The method according to claim 15, further comprising:

identifying a computing device as being either external or internal based on the information transmitted by the computing device.

18. The method according to claim 17, further comprising:

generating a warning signal upon identification of an external computing device.

* * * * *